April 14, 1964 R. PERLEY 3,129,409

MAGNETIC TAPE TO PERFORATED TAPE DIGITAL INFORMATION CONVERTER

Filed May 5, 1959 2 Sheets-Sheet 1

INVENTOR.
RICHMOND PERLEY
BY
ATTORNEY

April 14, 1964 R. PERLEY 3,129,409

MAGNETIC TAPE TO PERFORATED TAPE DIGITAL INFORMATION CONVERTER

Filed May 5, 1959 2 Sheets-Sheet 2

INVENTOR.
RICHMOND PERLEY

BY [signature]

ATTORNEY

United States Patent Office 3,129,409
Patented Apr. 14, 1964

3,129,409
MAGNETIC TAPE TO PERFORATED TAPE DIGITAL INFORMATION CONVERTER

Richmond Perley, Glastonbury, Conn., assignor to United Aircraft Corporation, East Hartford, Conn., a corporation of Delaware Filed May 5, 1959, Ser. No. 811,179
2 Claims. (Cl. 340—172.5)

My invention relates to a digital information converter and more particularly to a device for continuously translating digital information from a magnetic type to a perforated type.

Many devices of the prior art such, for example, as a numerically controlled machine tool director require that the input information be provided in the form of a perforated tape. The control information in accordance with which the tool is to be driven, is often available only in the form of a magnetic tape record such as is produced by computers such as are known to the art. While the magnetic tape units of computers operate at a relatively high speed, of the order of fifteen thousand characters per second, tape perforating units known to the art operate at a relatively slow speed of, for example, sixty characters per second. In order that a perforated tape record be produced from a magnetic tape, the information must be received at a very high rate while being fed to the perforator at a slow speed.

Some devices are known in the prior art by means of which blocks of information on a magnetic tape are translated to a punched card. No systems of the prior art, however, continuously translate information from a high speed magnetic tape unit to a relatively slow speed tape perforating unit.

I have invented a digital information converter which continuously translates information from a high speed magnetic tape unit to a low speed perforating unit. I provide my system with means for interrupting the operation of the converter in the event that erroneous information is being transferred from the magnetic tape to the perforated tape. I accomplish this result whether the error is in the number of bits in a particular channel or whether the error be in the number of pulses or bits in a particular character.

One object of my invention is to provide a digital information converter for translating information from a magnetic tape record to a perforated tape.

Another object of my invention is to provide a digital information converter for continuously translating information from a high speed magnetic tape unit to a relatively low speed tape punch unit.

A further object of my invention is to provide a digital information converter for translating information from a magnetic tape unit to a tape perforating unit, while providing a check on the correctness of the information.

A still further object of my invention is to provide a digital information converter for translating information from a magnetic tape record to a tape perforating unit, while providing a check of the information both as to the number of bits in each channel and as to the number of bits in each character.

Other and further objects of my invention will appear from the following description.

In general my invention contemplates the provision of a digital information converter including a shift register adapted to receive and store a number of characters corresponding to a block of information recorded on a magnetic tape. When the last character of a block is stored in the register, the first stored character is shifted out of the register to disable the tape reading device and to stop the tape. This character enables the punch mechanism gate circuits. Pulses produced by the punching unit shift the remaining stored characters out of the storage register to permit them to actuate the punch pulse current generators to cause the punch to perforate a paper tape or the like with the same record as that record on the magnetic tape. As the "end of block pulse" shifts out of the storage register, it disables the punch pulse current generators and enables the tape reading circuits while starting the tape to cause the system to read the next block of information. I provide my converter with one channel which produces a paper stepping pulse. My converter includes means for interrupting its operation in the event that there is an error either in the number of pulses in a channel or in the number of bits in a character.

In the accompanying drawings which form part of the instant specification and which are to be read in conjunction therewith and in which like reference numerals are used to indicate like parts in the various views.

Figure 1:
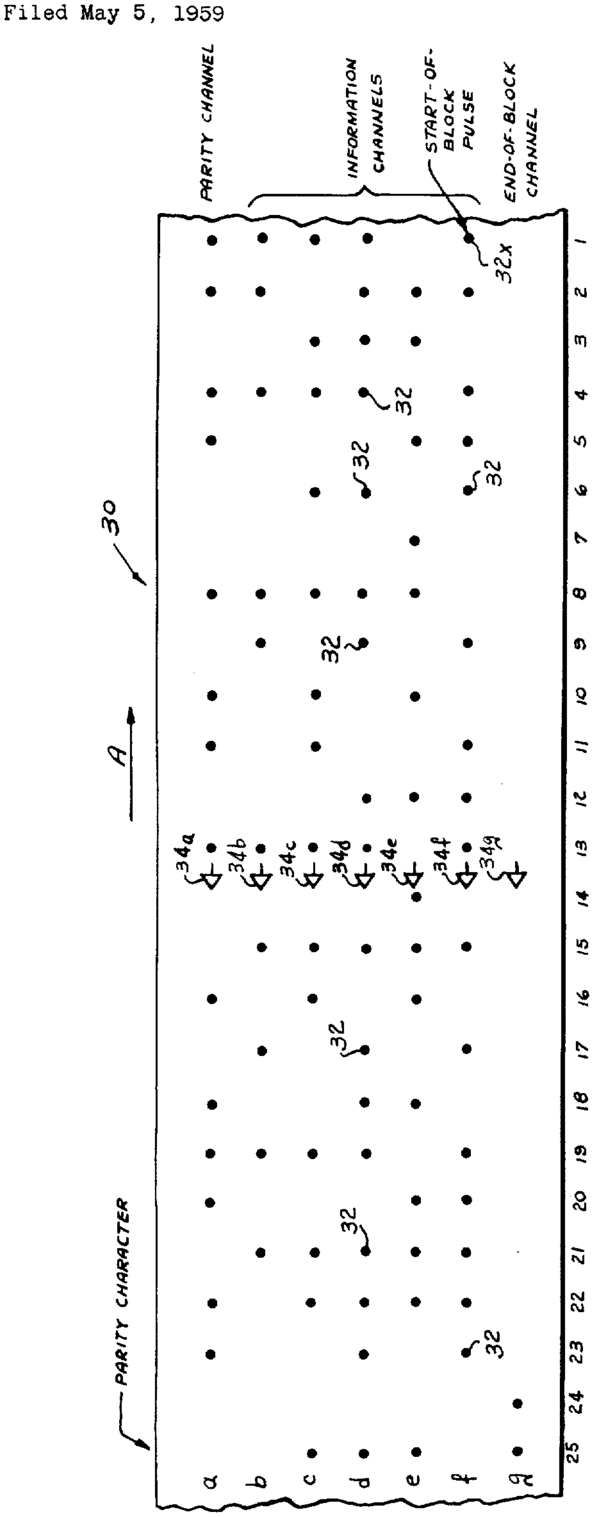
FIGURE 1 is a schematic view illustrating a fragment of a magnetic tape record which is to be translated to a perforated tape.

Referring now to FIGURE 1 of the drawings, the magnetic tape indicated generally by the reference character 30 carrying the record of information which is to be translated to perforated tape, includes a number of channels which I have designated by the respective letters *a* to *g*. I have shown by way of example a tape 30 having seven channels. The information recorded on the tape is in the form of blocks, one block of which may include 23 information characters designated as 2 to 24 in FIGURE 1. Each character is made up of a number of recorded pulses represented by dots 32 in FIGURE 1. It will be seen that the first information character includes seven places which may be designated respectively as $a_1$, $b_1$, $c_1$, $d_1$, $e_1$, $f_1$, and $g_1$. The first character in a block includes a "start-of-block" pulse 32*x*, which, for example may be the $f_1$ pulse. Since, as will be explained in detail hereinafter, the "*g*" channel is an "end-of-block" channel which carries a pulse represented by a dot 32 in the twenty-fourth place, and since the "*a*" channel is a check or parity channel, as will be explained hereinafter, only five of the channels on the tape are information channels. In addition to the characters from 2 to 24, the tape 10 is provided with an additional character in the twenty-fifth place to provide a check of the number of pulses in each channel, as will be explained hereinafter.

I provide my digital information converter with respective reading heads 34*a* and 34*g* associated with the respective record channels of my device. Any suitable drive means (not shown) known to the art may be provided for moving the tape 30 past the heads 32 in the direction of the arrow "A" in FIGURE 1.

Figure 2:
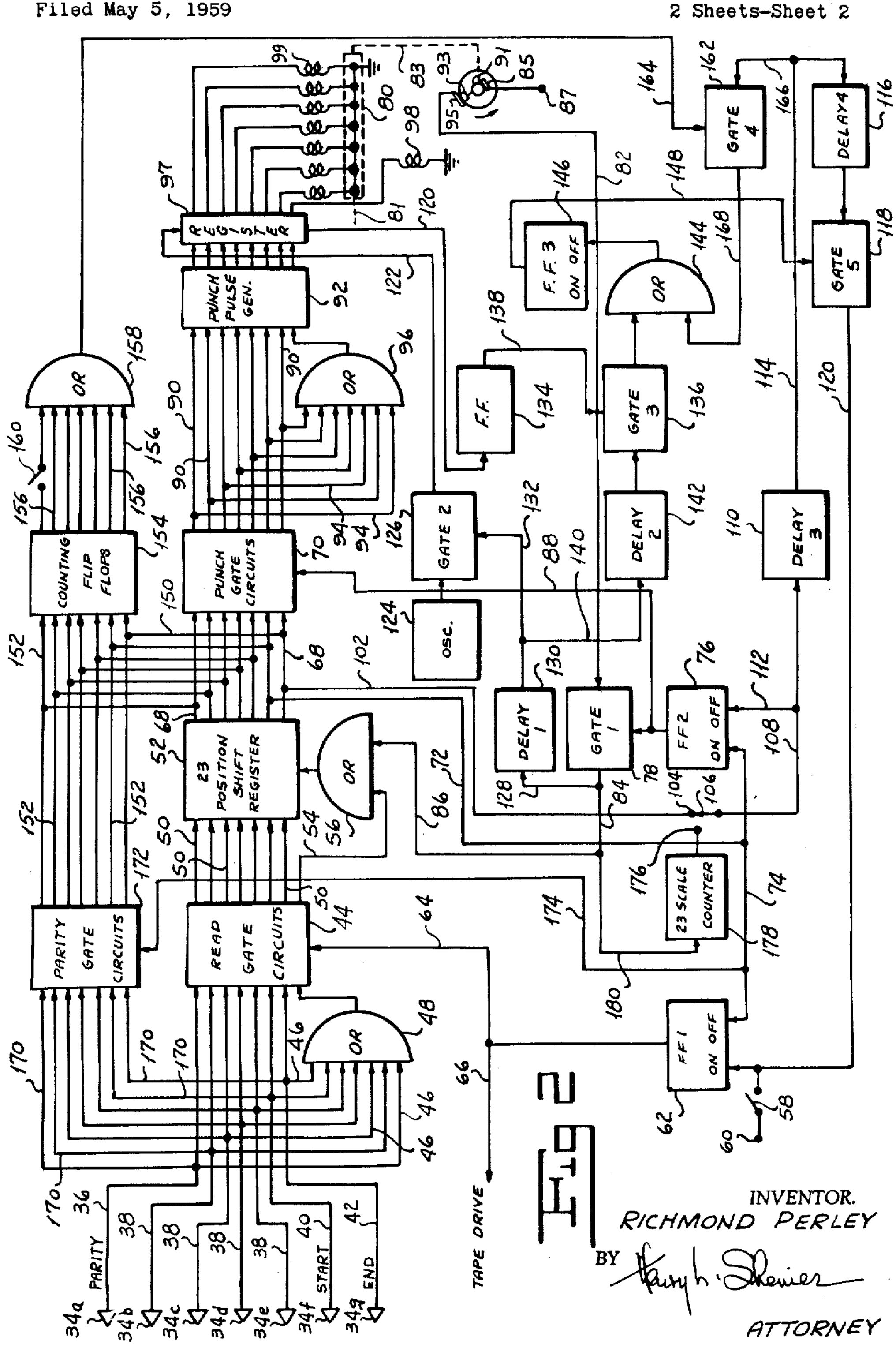
FIGURE 2 is a block diagram showing the arrangement of the logic circuit components of my digital information converter.

Referring now to FIGURE 2, my digital information converter includes a vertical parity or checking channel 36, a plurality of information channels 38, a start-of-block channel 40, which also is an information channel, and an end-of-block channel 42. I connect heads 34*f* and 34*g* respectively to channels 40 and 42. The heads 34*b* to 34*e* feed channels 38, while head 34*a* feeds the channel 36. I connect the channels 36, 38, 40, and 42 to respective input terminals of a number of reading gate circuits indicated schematically by the block 44 in FIGURE 2. Respective conductors 46 connect the channels 36, 38, 40, and 42 to the input terminals of a 7-input OR circuit 48, the output of which is applied to an input terminal of a gating circuit in the block 44. Respective channels 50 couple the outputs of the gating circuits of block 44 other than that fed by the circuit 48 to the respective input terminals of a twenty-three position shift register 52 of a type known to the art adapted to receive and store groups of pulses fed to its input terminals. A channel 54 couples the output of the gating circuit fed by OR circuit 48 to one input terminal of a 2-input OR circuit 56, the output of which actuates the register 52 to cause the register to shift through one position in a direction from left to right, as viewed in FIGURE 2.

A manually operable switch 58 connected to the terminal 60 of a suitable source of electrical potential and to the "on" input terminal of a flip-flop circuit 62 may be operated to turn the flip-flop on to cause a signal to be applied to the gating circuits 44 through a conductor 64 to enable these circuits. A conductor 66 applies the output of flip-flop circuit 62 to the tape driving unit (not shown) to cause the tape 30 to be driven past the heads 34 in a manner known to the art.

From the structure thus far described, it will be apparent that with switch 58 closed to turn flip-flop circuit 62 on, the recorded spots on the tape 30 produce pulses in the heads 34 which pass through channels 36, 38, 40, and 42 and through the gating circuits 44 to the shift register 52. The record on tape 30 is such that in any place along the length of the tape, at least one pulse has been recorded. As a result, OR circuit 48 always has an output signal. This signal passes through a gating circuit 44, channel 54, and OR circuit 56 to step or shift register 52.

As has been explained hereinabove, only twenty-three of the characters in a block of the record on tape 30 contain information. The respective characters are fed into the register 52 by the reading gate circuits 44 until the register 52 is completely loaded with twenty-three characters. As the twenty-fourth character is fed into the register, the first character passes out of the register through channels 68 which connect the shift register output terminals to the input terminals of punch gating circuits included in the block 70. The first character in any record always includes a pulse represented by a dot **32*x* in the "start-of-block" channel 40. As this pulse passes out of the shift register 52, it travels through a channel 72 to a conductor 74 connected both to the "off" terminal of the flip-flop circuit 62 and to the "on" terminal of a second flip-flop circuit 76. Thus as the first character passes out of the shift register 52, it turns circuit 62 off to disable the tape drive and to disable the reading gate circuits 44. At the same time this first character containing the pulse represented by dot 32*x* turns the flip-flop circuit 76 on to enable a gating circuit 78. As will be apparent from the description given hereinafter, this first character recorded on the magnetic tape 30** is not punched into the paper tape.

Any suitable mechanism known to the art, indicated schematically in FIGURE 2 at 81 continuously rotates the punch mechanism shaft 80. As is well known in the art, a linkage 83 connects the shaft 80 to a slip ring 91 engaged by a brush 85 connected to a terminal 87 of a suitable source of electrical potential. I connect a conducting segment 93 mounted for rotation with ring 91 to the ring 91. Once during each revolution of shaft 80 segment 93 engages a brush 95 to produce a synchronizing pulse on a channel 82 connected to brush 95. Channel 82 carries the synchronizing pulse from the punching mechanism 80 to the input terminal of gating circuit 78. The pulse passes through the gating circuit 78 and through a conductor 84 to a conductor 86 connected to the other input terminal of the OR circuit 56. Thus, each time a synchronizing pulse is produced by the punching mechanism, it causes a character to shift out of the register 52.

A conductor 88 connects the output terminal of the flip-flop circuit 76 to the control terminal of the gating circuits 70 to enable these circuits during the punching cycle of my converter. Each time a character shifts out of the register 52, it passes through the channels 68 and through the enabled gating circuits 70 to channels 90 which couple the punch gating circuit outputs to the input terminals of the punch pulses generators 92. Respective conductors 94 connect the output channels 90 of gating circuits 70 to the input terminals of a 7-input OR circuit 96, the output terminal of which is connected to the input terminal of one of the current generating circuits 92.

The currents generated by the circuits 92 all pass through a register 97 which may be loaded in parallel and unloaded in series in a manner which will be described in detail hereinafter. After passing through the register 97, all the currents produced by the circuits 92, except that current from the circuit which is fed by OR circuit 92, pass through respective punch magnet windings 99 to actuate the character punches in a manner known to the art to perforate the tape (not shown). The current from that circuit 92, which is fed by OR circuit 96, passes through a circuit of register 97 and through a winding 98 which drives the paper tape through one step in a manner known to the art. As the tape completes a step of its movement, segment 93 engages brush 95 to generate a synchronizing pulse which passes through the channel 82 to cause the next character to be unloaded from the register 52.

The operation described hereinabove continues until the twenty-fourth character shifts out of the register 52. As can be seen by reference to FIGURE 1, only this character and the parity character contain a pulse in the end-of-block channel. A conductor 102 connects the channel 68 carrying the end-of-block pulse to a contact 104 engaged by a switch arm 106 connected by a conductor 108 to the input terminal of a delay circuit 110. A conductor 112 connects conductor 108 to the "off" input terminal of flip-flop circuit 76 to turn the circuit off and thus to disable gating circuit 78 to prevent synchronizing pulses on channel 82 from passing through circuit 78 to the shift register 52.

A conductor 114 couples the output signal of delay network 110 to the input terminal of a delay network 116, the output terminal of which is connected to the input terminal of a gating circuit 118. I connect the output terminal of the circuit 118 to the "on" control terminal of flip-flop circuit 62 by means of a conductor 120. It will be seen that when the character containing the end-of-block pulse passes out of the register 52, it travels through switch arm 106 to turn flip-flop circuit 76 off. After a time delay provided by networks 110 and 116, the end-of-block pulse passes to the flip-flop circuit 62 to turn this circuit on to enable the tape drive and to enable gating circuits 44 to permit the next block of information to be read.

As has been explained hereinabove, I provide my converter with means for interrupting the operation of the converter in the event that an error exists either in the number of pulses in a character or in the number of bits in a channel of the record. As has also been explained hereinabove, the parity channel "*a*" is provided with pulses which make the number of pulses in any character an odd number. The currents produced by the generating circuits 92 pass in parallel through the register 97 to actuate this register in accordance with the arrangement of pulses in a character above. Since the paper-advancing current also passes through this register, the register should at all times indicate that an even number of pulses have passed through the register. The nature of register 97 is such that it may be loaded in parallel, while being unloaded in series through a channel 120 in response to pulses carried by a channel 122 to the control terminal of the register 97.

I connect the output terminal of an oscillator 124 to the input terminal of a gating circuit 126, the output terminal of which is connected to channel 122. A conductor 128 connects the output terminal of gating circuit 78 to a delay network 130, the output terminal of which is connected to the control input terminal of gating circuit 126 by a conductor 132. It will be seen that each synchronizing pulse which passes through the gating circuit 78 is applied to the input terminal of delay network 130. After a predetermined delay time, the pulse passes to the control input terminal of the gating circuit 126 to enable the circuit to permit pulses produced by the oscillator 124 to pass through the channel 122 to unload register 97 in serial fashion to cause the information stored therein to pass out in sequence to the channel 120. It is to be understood, of course, that the frequency of oscillator 124 is sufficiently high to permit the register 97 to be unloaded in the interval between successive synchronizing pulses. I connect channel 120 to the input terminal of a counting flip-flop circuit 134, the output terminal of which is coupled to the control terminal of a gating circuit 136 by means of a conductor 138. The counting flip-flop circuit 134 is the same as a conventional flip-flop circuit with the exception that its "on" and "off" input terminals are connected together. As a result of this connection each time a pulse is applied to the input terminal of the counting circuit 134, it changes this condition. Thus, this circuit, which originally is off, is again off after the application of an even number of pulses to its input terminal. If, however, an odd number of pulses are applied to the input terminal, the circuit will be in the on condition at the end of the counting operation and gating circuit 136 will be enabled.

A conductor 140 connects the conductor 132 to the input terminal of a delay network 142, the output terminal of which is connected to the input terminal of the gating circuit 136. I connect the output terminal of the circuit 136 to one input terminal of a 2-input OR circuit 144, the output terminal of which is connected to the off input terminal of a normally on monostable multivibrator circuit 146. A conductor 148 connects the output terminal of circuit 146 to the control terminal of gating circuit 118. Since circuit 146 is normally on, circuit 118 is normally enabled.

If an erroneous character has been recorded with the result that register 97 stores an odd number of pulses, then, after this register is read, counting flip-flop circuit 134 is in the on condition with the result that gating circuit 136 is open. When the synchronizing pulse passed through the delay circuit 130, it also passed through conductor 140 and through the delay circuit 142, the gating circuit 136, and the OR circuit 144 to turn off the flip-flop circuit 146 and thus disable gating circuit 118. Once an error has turned circuit 146 off to disable gating circuit 118, the end-of-block pulse at the end of the punching cycle will not pass through the gate to start a new reading cycle, and my converter will stop to indicate the existence of an error in the block of information just punched into the tape.

I provide my converter with means for stopping its operation in the event that an error exists in the number of pulses in any channel. As has been explained hereinabove, each record block is provided with a parity character containing dots representing pulses in such channels as are necessary to provide an even number of pulses in each channel. Respective channels 150 connect the channel 68 to conductors 152 leading to the input terminals of a bank of counting flip-flop circuits 154. Conductors 156 connect the output terminals of the counting flip-flop circuits 154 to the respective input terminals of a 7-input OR circuit 158. A switch 160 in the conductor 156 carrying the information on the parity channel may be opened to prevent the parity information from being fed to the OR circuit 158. I connect the output terminal of circuit 158 to the control input terminal of a gating circuit 162 by means of a conductor 164. A conductor 166 connects the channel 114 carrying the end-of-block pulse to the input terminal of gating circuit 162. A conductor 168 connects the output terminal of circuit 162 to the other input terminal of the OR circuit 144.

Respective conductors 170 connect the respective channels 36, 38, 40, and 42 to the input terminals of parity gating circuits indicated by the block 172. A conductor 174 couples the start-of-block pulse on conductor 74 to the control input terminal of the circuits 172. As has been explained hereinabove, when the register 52 is fully loaded, the first character passes out of the register as the twenty-fourth character enters the register. The start-of-block pulse 32*x* passes through conductor 72 to the conductor 74 to turn flip-flop circuit 62 off to mark the end of the tape reading cycle. This start-of-block pulse 32*x* also passes through conductor 174 to enable the gating circuits 172 momentarily to permit the parity character on the record to pass through these circuits to the counting flip-flops 154. As the characters shift out of the register 52 during the punching cycle, they travel through conductors 150 and 152 to the counting flip-flop circuits 154. As has been explained hereinabove, if an even number of pulses have passed through the counting flip-flop circuits, these circuits will again be in their initial state. If, however, an odd number of pulses have passed through the flip-flop circuits, at the end of the counting operation their condition will be opposite from their initial condition. Thus if the number of pulses in each channel along the tape 30 is even, the circuits 154 will be off at the end of the operation of transferring one block of information from the magnetic tape to the paper tape. If, however, an error exists so that the number of pulses in any one of the channels is odd, then at the end of the block one of the circuits 154 is on with the result that gating circuit 162 is enabled. When this occurs, the end-of-block pulse can pass from conductor 114 through the gating circuit 162 and through the OR circuit 144 to turn the flip-flop circuit 146 off to disable gating circuit 118. Thus the end-of-block pulse, which is delayed by the network 116, cannot pass back to the flip-flop circuit 62 to start the next reading cycle. In this manner my converter automatically stops in the event that an error exists in the number of pulses in any channel. Since the end-of-block pulse may occur at any point within the twenty-four character record, the number of pulses contained by the flip-flop circuit 154 in the parity channel is not necessarily an even number at the time the end-of-block signal appears. For this reason I provide the switch 160 for disconnecting the parity channel from the input terminal of circuit 158.

By moving the switch arm 106 out of engagement with the contact 104 and into engagement with a contact 176, I may modify my converter to cause it to operate without the necessity for using an end-of-block pulse. I connect contact 176 to the output terminal of a counter 178 adapted to be set to produce an output signal after a predetermined number of pulses have been applied to its input terminal. I connect the conductor 84 carrying the synchronizing pulse to the input terminal of counter 178 by means of a conductor 180. I set the counter 178 to produce an output signal after twenty-three pulses have been applied to the input terminal of the counter. The output pulse from counter 178 passes to the conductor 108 to start the next reading operation when a punching cycle has been completed.

In operation of my apparatus for translating information from a magnetic tape such, for example, as the tape 30 to a paper tape to initiate operation of the apparatus, I close switch 58 to turn the flip-flop circuit 52 on to energize the tape drive means (not shown) through the conductor 66 and to enable the gating circuits 44. As the tape passes by the reading heads 34*a* to 34*g*, the characters produce pulses which pass through the gating circuits 44 to the register 52. Each character of the record contains at least one pulse with the result that the input terminal of the gating circuit 44 fed by OR circuit 48 always carries a pulse. This pulse passes through the circuit 44 and through the OR circuit 56 to step the shift register 52.

In operation of my device with switch arm 106 in engagement with contact 104 this procedure continues until, as the twenty-fourth character passes into the register 52, the first character containing the pulse 32*x* passes out of the register and through conductor 72 to conductor 74 to turn the flip-flop circuit 62 off and to turn the flip-flop circuit 76 on. At the same time the pulse 32x momentarily enables the parity gating circuits 172 to permit the check or parity character to pass through these circuits to flip-flop circuits 154.

With flip-flop circuit 76 on and with flip-flop circuit 62 off, the channel 82 carries a synchronizing pulse at the end of each movement of the paper tape. These pulses pass through the gating circuit 78 which has been enabled by the flip-flop circuit 76 and through the conductor 86 to the OR circuit 56 to shift the characters out of the storage register 52. This operation continues until the end-of-block pulse passes out of the register. The end-of-block pulse travels along conductor 102 and through switch arm 106 to the conductor 108 to turn the flip-flop circuit 76 off. After a time delay provided by networks 110 and 116, the end-of-block pulse passes through the normally enabled gating circuit 118 to the flip-flop circuit 62 to turn this circuit on to begin the next reading cycle.

Each character being read is stored temporarily in the register 97 under the action of the currents produced in the generator 92. The synchronizing pulse on channel 82 also is fed through a delay network 130 to a conductor 132 to enable gating circuit 126. Pulses produced by the oscillator 124 pass through the gating circuit 126 to the register 97 to cause the information stored in the register to shift serially out of the register. This information passes along conductor 120 to the counting flip-flop circuit 134. If the number of pulses fed to the flip-flop circuit 134 is even, as should be the case owing to the pulses contained in the parity channel, then this circuit is off when all the pulses in the character have been counted. If, however, there is an error in any character, this counting circuit will be on at the end of the block of information to enable the gating circuit 136. If the gating circuit is thus enabled, the synchronizing pulse which has been delayed by network 142 passes through the gating circuit 136 and through OR circuit 144 to turn the flip-flop circuit 146 off to disable gating circuit 118. Thus at the end of the punching cycle, the end-of-block pulse cannot pass through gating circuit 118 to the flip-flop circuit 62 to start the next reading operation.

Both the parity character and the characters shifting out of the register 52 pass through the counting flip-flop circuits 154. If an error exists in the number of pulses in any channel at the end of the punching cycle, one of the flip-flop circuits 154 will be on with the result that gating circuit 4 is enabled, and the end-of-block pulse passes through this circuit and through OR circuit 144 to turn the flip-flop circuit 146 off to disable gating circuit 118. When this occurs, the end-of-block pulse, which is delayed by the network 116, is unable to pass to the flip-flop circuit 62 to start the next counting cycle.

In the alternate form of my apparatus for translating information from magnetic tape to perforated paper tape, I move switch arm 106 into engagement with contact 176 to cause the counter 178 to count the number of synchronizing pulses and to produce an output signal at the end of a block of information. This pulse does away with the necessity for recording a pulse in the end-of-block channel of the magnetic tape.

It will be observed for purposes of clarity in exposition, I have not shown known details of the components of my apparatus, owing to the fact that the elements making up the components are conventional in the art.

The circuits of the groups of gating circuits 44, 70, and 172, as well as the individual gating circuits 78, 118, 126, 136, and 162 are circuits of a type known in the art which amplify or pass signals only in the presence of an appropriate synchronizing or "gating" pulse which "opens the gate" or enables the circuit.

Each of the circuits of the bank of flip-flop circuits 154 as well as each of the individual flip-flop circuits 62, 76, 134, and 146 may be formed with two inverters connected in a loop arrangement. If one inverter is conducting, its output potential is such as to hold the second inverter nonconducting. In response to an input pulse, the circuit alters its state of stable equilibrium from the condition where one inverter is conducting to the condition where the other inverter is conducting.

The shifting register 52 may be made up of a number of banks of flip-flop circuits or bistable magnetic elements in which the number of bits in each character and in which there are 23 banks in the bank register shown. In response to a shift pulse each bank passes the information contained therein to the next bank.

Each of the OR circuits 48, 56, 96, 144, and 158 may be formed by using a number of diodes equal to the number of inputs with the cathodes of the diodes connected to one terminal of resistor, the other terminal of which is connected to a suitable source of negative potential. Such circuit produces a positive output signal at the terminal of the resistor to which the cathodes are connected in response to a positive potential applied to any one of the diode anodes.

The delay circuits 110, 116, 130, and 142 may be formed by a series of inductors and condensors as a lumped constant transmission line or one-shot multivibrators. As is known in the art, these circuits cause an electrical pulse to appear at an output terminal at a predetermined interval of time after its application to the circuit input terminal.

The parellel-in, series-out register 97 is a bank of bistable magnetic elements connected in series between the respective pulse generators in block 92 and the windings 99 and 98. The elements are interconnected so that their outputs appear in sequence on channel 120 in response to shift pulses on channel 122.

Bank 92 includes a plurality of pulse generators of a suitable type known in the art each of which generators is adapted to produce a current pulse of sufficient strength to energize a winding 99 in response to an output pulse from the register 52. The reading heads 34 are of any siutable type of magnetic pick up device known to the art which produces output pulses in response to a recorded magnetic pulse on the tape being read.

It will be seen that I have accomplished the objects of my invention. I have provided a digital information converter for translating information from a magnetic tape record to a perforated tape. My converter is adapted to receive information from a high speed magnetic tape unit and to transfer this information to a relatively slow paper tape perforating device. My converter couples a high speed magnetic tape unit directly to a slow tape perforating device. My converter includes means for checking the correctness of the information, both as to the number of bits in a character and as to the number of bits in any channel.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for converting a magnetic record made up of blocks of characters having recorded pulses in various respective channels in which each block has a parity channel whereby the number of pulses in each character is a number having a given characteristic and in which each block has a parity character whereby the number of pulses in each channel is a number having a certain characteristic to a perforated record including in combination means for reading said magnetic record to produce respective groups of pulses representing said characters, a storage register for storing said groups of pulses and shifted in response to a shift pulse to shift said characters serially out of said register, means coupling said reading means to said storage register, punching mechanism comprising means energized to condition said mechanism to punch predetermined characters and comprising means for producing a synchronizing pulse on each operation of the punching mechanism, means for coupling said synchronizing pulses to said register as shift pulses to shift the stored characters out of the register, means responsive to a certain pulse in the first character of a record block for enabling said synchronizing pulse coupling means, means responsive to the groups of pulses shifting out of said register for energizing said punching mechanism conditioning means, means responsive to a pulse at the end of a record block for disabling said coupling means and for enabling said reading means, first means for counting the number of pulses in each character, second means for counting the number of pulses in each channel and means responsive to said first and said second counting means for disabling said means responsive to a pulse at the end of a record when the number of pulses in any character is a number which differs from a number having said given characteristic and when the number of pulses in any channel is a number which differs from a number having said certain characteristic.

2. Apparatus as in claim 1 in which said first means for counting said character pulses comprises a parallel input register for receiving pulses from said storage register, a counting flip-flop circuit for receiving pulses from said parallel input register and means responsive to said synchronizing pulses for unloading said parallel input register in series.

References Cited in the file of this patent

UNITED STATES PATENTS

| | | |
|---|---|---|
| 2,702,380 | Brustman | Feb. 15, 1955 |
| 2,708,267 | Weidenhammer | May 10, 1955 |
| 2,854,652 | Smith | Sept. 30, 1958 |
| 2,911,625 | Kun Li Chien | Nov. 3, 1959 |
| 2,918,659 | Gaddis et al. | Dec. 22, 1959 |
| 2,944,248 | Auerbach et al. | July 5, 1960 |
| 2,951,233 | Tanco et al. | Aug. 30, 1960 |

OTHER REFERENCES

Richards, R. K.: Digital Computer Components and Circuit, D. Van Nostrand Co., Inc., New York, N.Y., copyright 1957, pp. 187 to 262 and 297.

Publication II: Susskind, A. K., Analog-Digital Conversion Techniques, The Technology Press, Mass. Inst. of Technology, 1957, pages 1–7 relied on.

Publication III: Grable, Ramo and Wooldridge, Handbook of Automation, Computation and Control, vol. 2, John Wiley & Sons, Inc., N.Y., copyright 1959, pages 20 to 24 and 20 to 25 relied on.